United States Patent [19]

Orban

[11] 3,995,828
[45] Dec. 7, 1976

[54] BOLT TENSIONING APPARATUS
[75] Inventor: Joseph N. Orban, Cranford, N.J.
[73] Assignee: Biach Industries, Inc., Cranford, N.J.
[22] Filed: Sept. 16, 1975
[21] Appl. No.: 613,967
[52] U.S. Cl. .............................. 254/29 A; 81/57.38
[51] Int. Cl.² ........................................ E21B 19/00
[58] Field of Search ................. 254/29 A; 81/57.38
[56] References Cited
UNITED STATES PATENTS

| 3,362,682 | 1/1968 | Meschonat et al. | 254/29 A |
| 3,679,173 | 7/1972 | Sherrick et al. | 254/29 A |
| 3,722,332 | 3/1973 | Jones | 254/29 A |
| 3,844,533 | 10/1974 | Markiewicz et al. | 254/29 A |

Primary Examiner—Al Lawrence Smith
Assistant Examiner—Robert C. Watson
Attorney, Agent, or Firm—Edward R. Weingram

[57] ABSTRACT

A bolt tensioner has a cylinder and piston assembly whose piston is connected to a puller bar on which is mounted a socket formed with segments for connecting the puller bar to a bolt to be tensioned, and the inner surface of a sleeve reciprocable on said puller bar and the outer surfaces of said segments have coactive circumferential ridges and grooves with beveled sides to actuate and hold the segments into cooperative relation to the bolt and means to actuate the segments out of said cooperative relation upon movement of the sleeve into lower and upper positions, respectively. A reciprocable power operated apparatus connected to the upper end of the sleeve reciprocates the sleeve.

11 Claims, 10 Drawing Figures

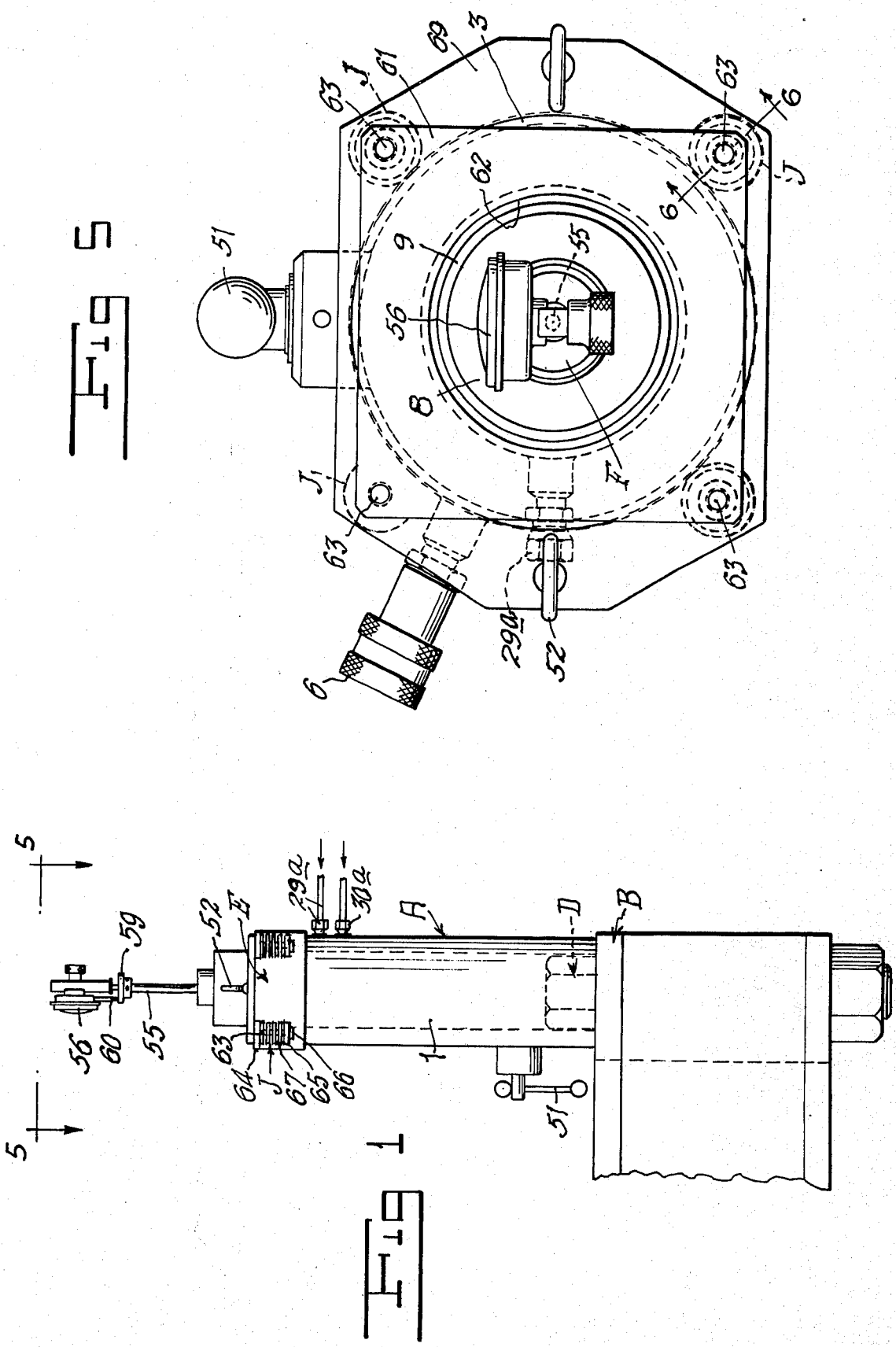

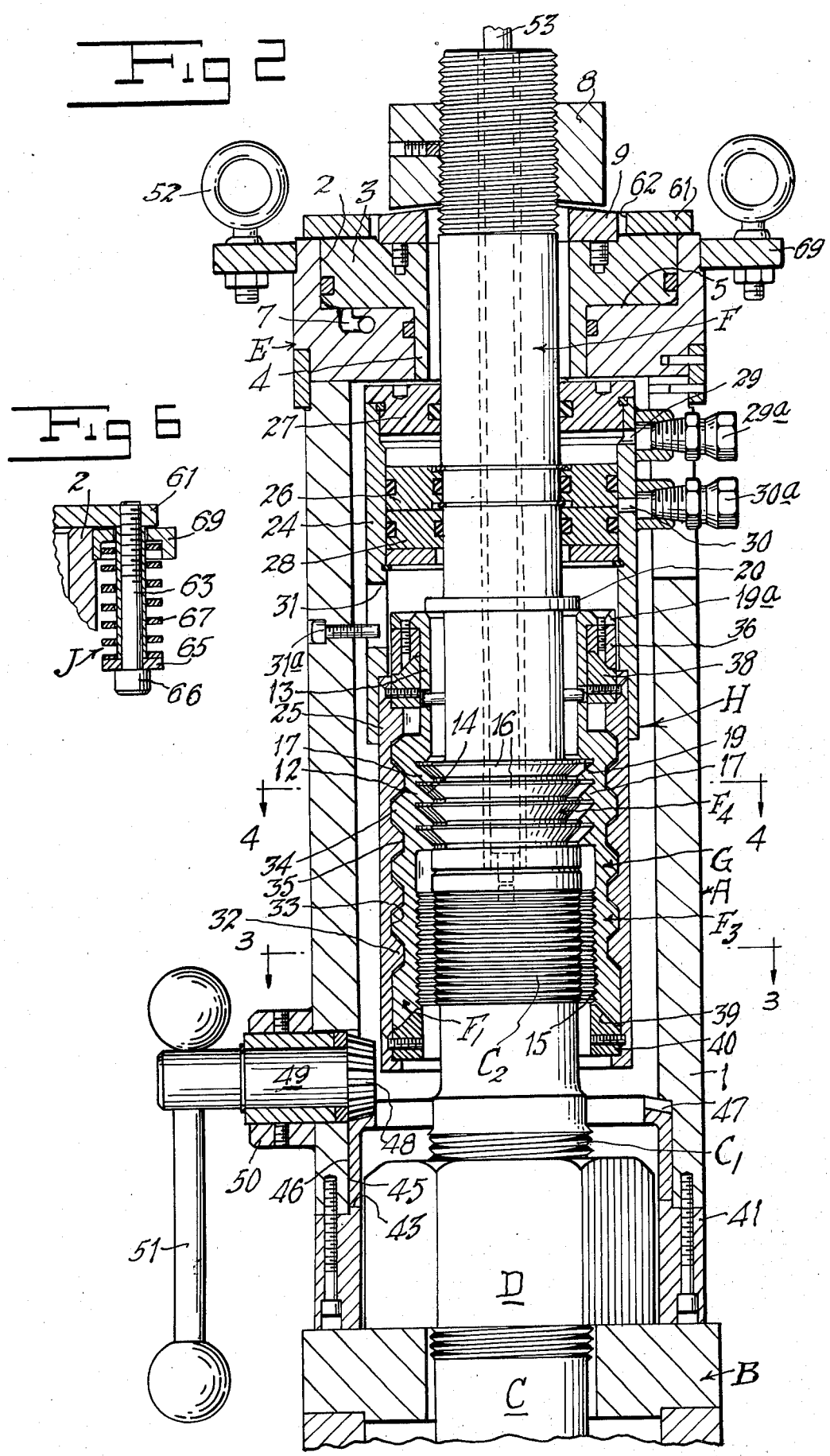

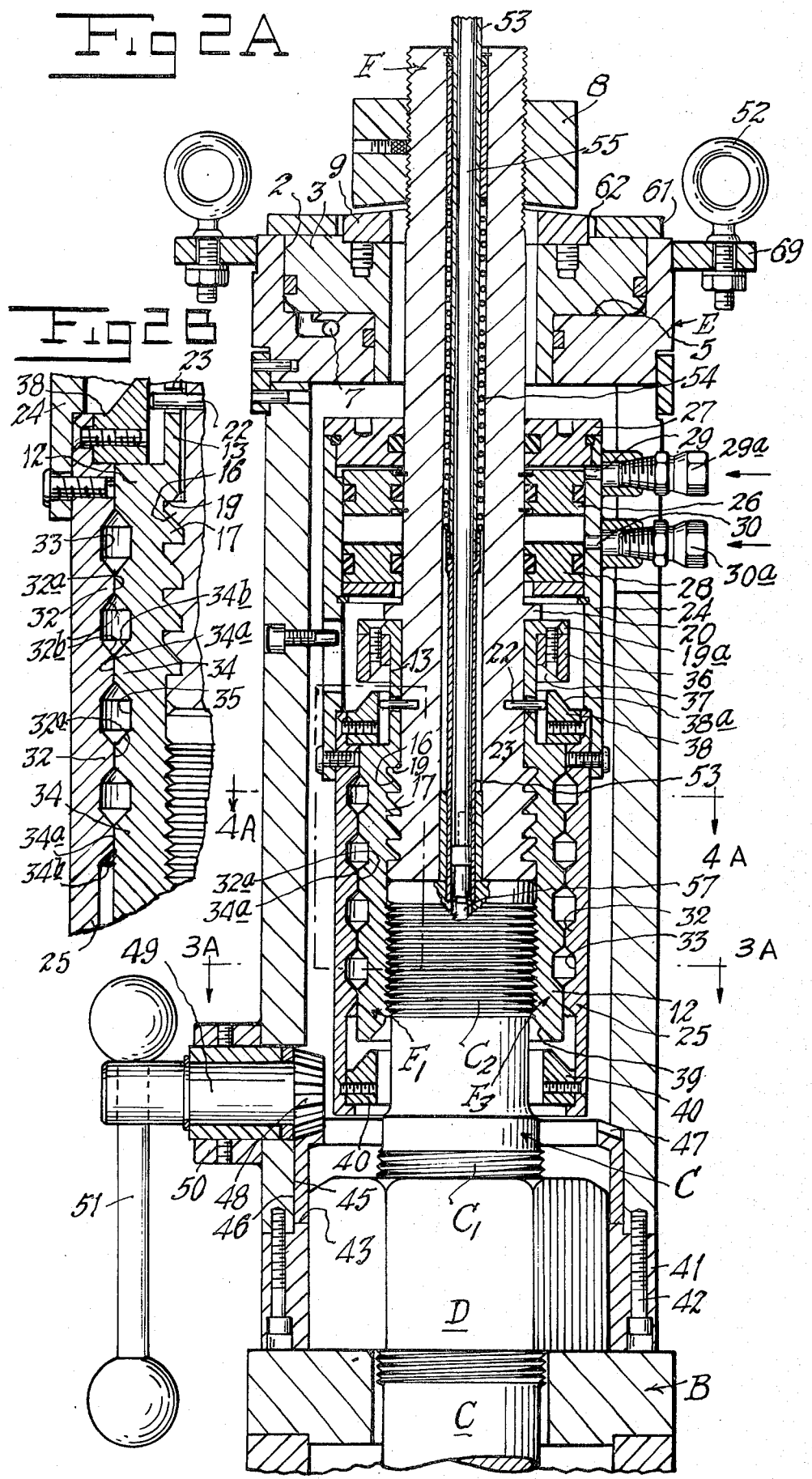

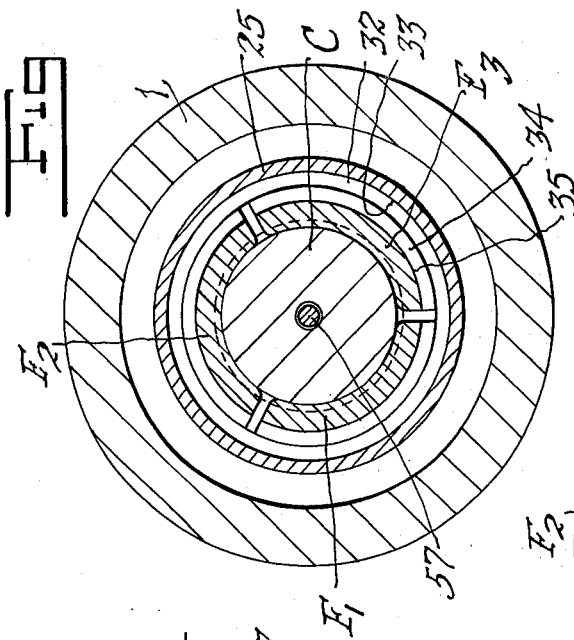
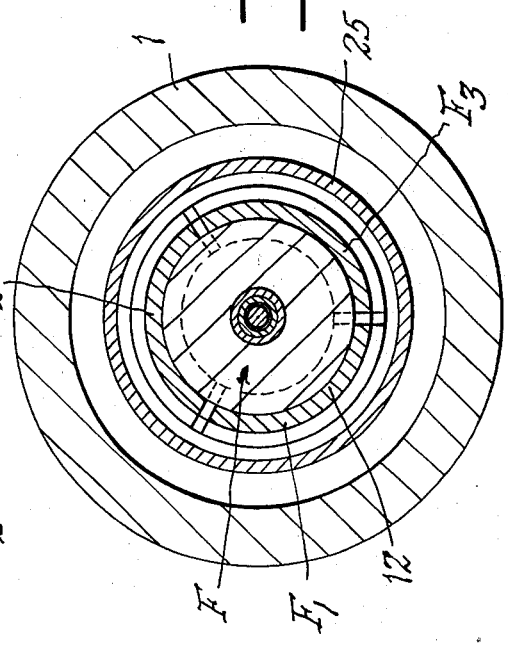
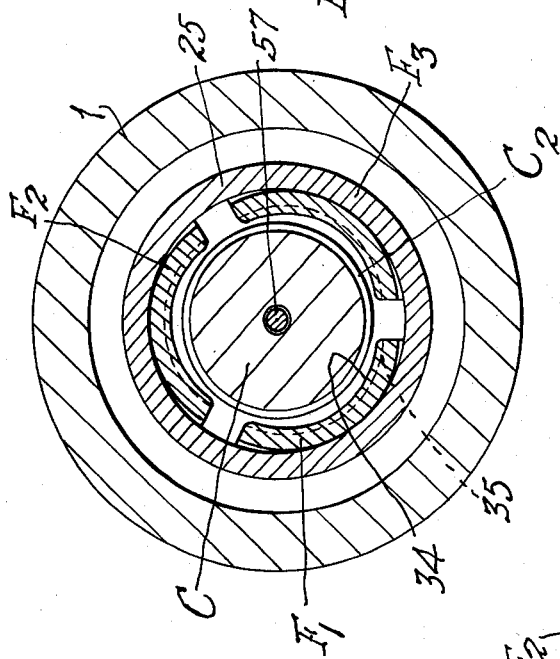
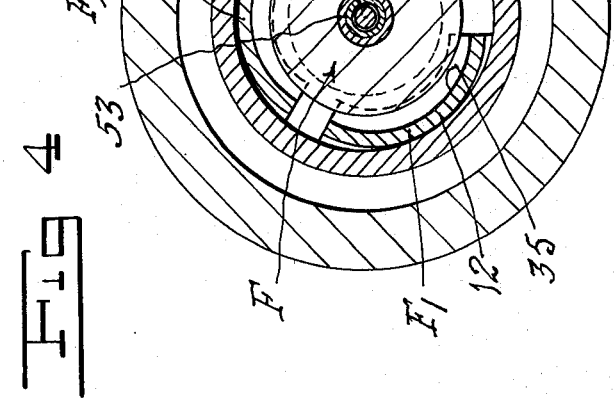

BOLT TENSIONING APPARATUS

BACKGROUND OF THE INVENTION

This invention relates to bolt or stud tensioners of the type that include a housing to be set on a structure from which extends a bolt to be tensioned by a puller bar reciprocable in said housing while a nut on the bolt is tightened against said structure. More particularly, the invention is concerned with mechanism for connecting said puller bar to the bolt, which comprises a socket including a plurality of complemental segments having surfaces coactive with surfaces on the bolt and being mounted on said puller bar and movable into a first position into loosely surrounding relation to the bolt and into a second position wherein said surfaces on said segments interlock with said surfaces on said bolt, and mechanism for releasably locking said segments in said second position. U.S. Pat. Nos. 3,008,362, 3,128,990 and 3,844,533 are examples of such tensioners.

The prior art tensioners leave much to be desired in reliability and efficiency, and the mechanisms for manipulating and locking the socket segments require manual operation which consumes excessive amounts of time and labor.

SUMMARY OF THE INVENTION

Important objects of the present invention are to provide a bolt or stud tensioner which overcomes the objections to and disadvantages of the prior art tensioners, and to provide a bolt tensioner wherein the mechanism for releasably locking the socket segments on the bolt is power operated, and particularly, fluid-pressure operated.

The invention also provides a novel and improved construction and combination of a puller bar, a segmental socket therefor, and a reciprocable power-operated locking sleeve for actuating the socket segments into interlocked relation to the bolt and for releasably holding said segments in said interlocked relation to the bolt while the puller bar is exerting tension on the bolt.

It is another object of the invention to provide such a combination wherein the locking sleeve includes means for positively disengaging or releasing the socket segments from the bolt.

In accordance with the invention the socket segments are supported on the puller bar for movement radially in relation to the puller bar, and the socket segments and puller bar have coactive surfaces so that the segments are directly interlocked with the puller bar and so held by said locking sleeve at the same time coactive surfaces on the bolt and on the segments are actuated into and held in direct interlocked relation to ensure that the connection between the segments and the puller bar and the connection between the segments and the bolt during the tensioning movement of the puller bar, are adequate to withstand the application of the desired tension to the bolt.

It is another feature of the invention that the puller bar socket comprises three complemental segments of identical shape each of which forms an arc of about 120° and the locking sleeve is cylindrical, encircles the socket and has interior parallel circumferential ridges and grooves alternately spaced longitudinally of the sleeve having cylindrical surfaces and beveled sides and coactive with similar ridges and grooves on the outer sides of the socket segments so that upon longitudinal movement of the locking sleeve in one direction the socket segments are actuated by the beveled side of the ridges in the direction to cause an interlocked relation of the socket segments with the bolt, which interlocked relation is held or maintained by contact of said cylindrical surfaces of the ridges of the segments and the sleeve, and upon movement of the locking sleeve in the opposite direction the socket segments are released into said grooves for disengagement from the bolt, and there is means for positively disengaging the socket segments from the bolt.

Another object is to provide a novel and improved construction and combination of the puller bar, the socket segments, the locking sleeve and a power-operated means, preferably of a piston and cylinder type mounted on the puller bar for activating said locking sleeve.

BRIEF DESCRIPTION OF THE DRAWINGS

For a complete understanding of the invention, reference should be had to the following description and the accompanying drawings in which:

FIG. 1 is a side elevational view of a bolt tensioner embodying the invention;

FIG. 2 is a central vertical longitudinal sectional view, on an enlarged scale with portions omitted, showing the puller bar socket in disengaged or released relation to the bolt;

FIG. 2A is a similar view showing the puller bar socket segments in interlocked relation to the bolt;

FIG. 2B is an enlarged view of the portion of FIG. 2A enclosed in broken lines.

FIG. 3 is a horizontal sectional view on the plane of line 3—3 of FIG. 2;

FIG. 3A is a similar view on the plane of the line 3A of FIG. 2A;

FIG. 4 is a horizontal sectional view on the line 4—4 of FIG. 2, showing the puller bar socket segments released from their directly interlocked relation to the puller bar;

FIG. 4A is a similar view on the line 4A—4A of FIG. 2A showing the puller bar socket segments directly interlocked with the puller bar.

FIG. 5 is a top plan view of the bolt tensioner from the plane of the line 5—5 of FIG. 1.

FIG. 6 is a sectional view on the plane of line 6—6 of FIG. 5.

DESCRIPTION OF THE PREFERRED EMBODIMENT

Referring to the drawings, the reference characters A and B generally designate respectively the bolt or stud tensioner and the structure from which extends a bolt C to be tensioned having screw threads $C_1$ on which is a nut D to be tightened against the structure.

While the tensioner may be adapted for connection to the conventional screw threads $C_1$ of the bolt which in that case must extend a substantial distance above the nut, it is desirable to provide an upper portion of the bolt extending above the nut with a series of circumferential spaced and parallel ribs or hands $C_2$ of any desired cross-section, one possible form of which is shown in FIGS. 2 and 2A. The special ribs can be formed of a size and shape to withstand the application of a desirable high degree of tension to the bolt, and eliminate the possibility of damage to the relatively fragile nut threads.

Turning now to a description of the tensioner A, FIGS. 1, 2 and 5 show a suitable housing comprising a tubular main portion 1 whose lower end is adapted to be set upon or bear against the structure B in loosely surrounding relation to the nut D. Mounted on the upper end of the housing is a power unit or motor E which is shown as comprising a cylinder 2 and a piston 3 reciprocable within the cylinder and having a integral piston rod 4 extending downwardly through the bottom wall 5 of the cylinder. The piston and piston rod have an axial opening through which extends a puller bar F to be actuated upwardly by the piston as hereinafter described. Fluid under pressure, preferably oil from a suitable source and controlled by a valve (not shown) is supplied through a pipe coupling 6 and a duct 7 to the cylinder beneath the piston for actuating the piston to move the puller bar F in the direction to exert tension on the bolt C. For returning the piston in the other direction any suitable means may be utilized but here spring assemblies J are provided as hereinafter described.

Mounted on the lower end portion of the puller bar within the housing is a segmental puller bar socket G for separably connecting the puller bar to the bolt, and adjustably screwed on the upper end portion of the puller bar above the housing, is a nut 8 having a bottom segmentally spherical surface to seat on the upper segmentally spherical surface of a washer 9 secured on the upper end of the piston 3 to permit limited lateral movement of the puller bar to ensure proper axial alinement of the puller bar socket with the bolt for accurate connection of the socket to the bolt.

The puller socket comprises a plurality of segments, preferably three, circularly arranged around the puller bar and here denoted $F_1$, $F_2$ and $F_3$, each segment forming an arc of about 120°. Each segment includes a body portion 12 and a mounting portion 13. The body portion has spaced longitudinally thereof interior surfaces 14 and 15 to interlock with surfaces $F_4$ and $C_2$ on the puller bar and on the bolt, respectively.

The surfaces $F_4$ are shown as comprising a plurality of circumferential parallel ribs 16 spaced apart longitudinally of the puller bar, the upper side of each of which is flat and in a plane normal to the axis of the puller bar while the lower side is beveled. The surfaces 14 on the segments comprise parallel ribs 17 corresponding in cross section to the spaces between the ribs 16 and having flat lower sides in planes parallel to and slidably contacting the upper sides of the ribs 16. The mounting portions 13 of the socket segments have inner shoulders 19 slidably abutting the upper side of the uppermost rib 16 and also have outwardly projecting flanges underlying and slidably engaging a circumferential flange 20 on the puller bar. With this construction, the segments may move horizontally inwardly toward and outwardly away from the axis of the puller bar to permit engagement and disengagement of the segments with the bolt, respectively, and when the segments move inwardly and the ribs 17 of the segments interlock with the ribs 16 on the puller bar, as shown in FIG. 2A, there is a strong connection between the puller bar and the segments for applying the desired tension to the bolt.

The surfaces 15 on the puller bar segments are moved into and out of engagement with the surfaces $C_2$ on the bolt at the same time the ribs 17 are engaged with and disengaged from the ribs 16 on the puller bar. The surfaces $C_2$ on the bolt comprise preferably circumferential parallel ridges 21 spaced longitudinally of the bolt whose general planes are perpendicular to the axis of the puller bar and which have upper and lower beveled sides the lower of which is disposed at a more acute angle than the upper side to said general plane. The surfaces 15 of the puller bar segments comprise parallel ridges corresponding in cross-section to the spaces between said ridges 21 and having their upper sides adapted to abut the lower sides of said ridges 21 when the segments are moved inwardly toward the bolt as shown in FIG. 2A, thereby to provide a firm connection between the puller bar and the bolt for applying the desired tension to the bolt.

Desirably, there are provided radial pins 22 fixed on the puller bar and passing loosely through openings 23 in the mounting portions 13 of the socket segments, to prevent rotation of the segments on the puller bar and hold the segments in the proper spaced relation to each other as shown in FIGS. 3 and 3A.

Important features of the invention are power-operated means for actuating the puller bar socket segments into and out of interlocked relation to the bolt and for releasably holding the segments in said interlocked relation to the bolt while the puller bar is exerting tension on the bolt. As shown, there is a sleeve H encircling the puller bar and the segments and comprising an upper portion 24 in the form of the side wall of a cylinder and a lower portion 25 for locking the segments. The cylinder wall portion 24 extends above the segments and is slidably coactive with a ring-like piston or static head 26 which is coaxially fixed on the puller bar between upper and lower ring-like cylinder heads 27 and 28, respectively, which are fixed on the cylinder side wall 24 in encircling and relatively slidable relation to the puller bar with suitable packing rings between the cylinder heads and the puller bar and the cylinder side wall 24. Between the upper cylinder head and the piston, the cylinder wall has an inlet 29 for motive fluid, preferably compressed air, and between the piston and lower cylinder head is another fluid inlet 30. Fluid under pressure is supplied to said inlets through pipe couplings 29a and 30a and controlled by valves in a suitable known way. With this construction, the sleeve H with the segment operating portion 25 can be actuated longitudinally in one direction or downwardly into its lower position by admitting fluid through the lower inlet 30 and releasing fluid from the space between the piston and the upper cylinder head, thereby to lock the segments as shown in FIG. 2A, and the sleeve can be actuated in the opposite direction into its upper position by admitting fluid through the upper inlet 29 and releasing fluid from the space between the piston and the lower cylinder head so as to release the socket segments as shown in FIG. 2. The cylinder wall portion 24 has a longitudinal slot 31 into which projects a pin 31a fixed in the housing to prevent rotation of the sleeve H.

The lower portion 25 of the sleeve H and the socket segments are coactive for moving the segments into and holding them in interlocked relation to the bolt upon movement of sleeve into its upper position, (see FIG. 2) and for releasing the segments from interlocked relation with the bolt upon movement of the sleeve into its lower position (see FIG. 2A). As shown, the sleeve portion 25 has spaced longitudinally thereof interior circumferential alternate ridges 32 and grooves 33, the ridges having cylindrical surfaces 32a and beveled sides 32b; and the segments have exterior similarly shaped but slightly narrower ridges 34 with cylindrical surfaces 34a and beveled sides 34b and grooves 35 such that when the sleeve is moved into its lower position the segments are moved into interlocking relation to the bolt by coaction of the beveled sides 32b and 34b, and the cylindrical surfaces 32a of the ridges 32 on the sleeve portion are in abutting contact with the cylindrical surfaces 34a of the ridges 34 on the socket segments, as shown in FIG. 2a so as to look or hold the segments in interlocking relation to the bolt. For releasing the socket segments from interlocked relation to the bolt, the grooves 33 of the sleeve portion 25 receive or provide clearance for the ridges 34 of the socket segments, and coactive means on the sleeve portion 25 and the socket segments are provided for actuating the segments out of interlocked relation to the bolt, upon longitudinal movement of the sleeve into its upper position. As shown, there is a cam block 36 secured on the mounting portion 13 of each segment and having a beveled surface 37 coactive with a beveled surface 38a on a cam block 38 secured on the inner side of the sleeve H, whereby when the sleeve moves into its upper position the segments are moved out of interlocking relation to the bolt as shown in FIG. 2. Also, the lower end of each segment has a beveled surface 39 coactive with the beveled surface on a cam block 40 secured on the inner side of the lower end portion of the sleeve H, whereby when the sleeve moves into its upper position, the segments are moved out of interlocked relation to the bolt, as shown in FIG. 2.

The lower end of the housing has a base ring 41 fastened on the bottom of the tubular main portion 1 by screws 42. Rotatably mounted in said main portion 1 between an interior shoulder 43 and the top of the base ring is a socket 44 for turning the nut D on the bolt C. The main portion 1 has a coaxial cylindrical bearing surface 45 and the socket 44 has an exterior cylindrical surface 46 rotatably slidably contacting said bearing surface. The interior of the socket 44 is polygonal to mate with the polygonal nut D on the bolt. The upper end of the socket 44 has a bevel gear 47 with which meshes a bevel pinion 48 mounted on a stub shaft 49 journaled in a bearing 50 which is secured on the housing portion 1 in radial relation thereto. The stub shaft has a handle 51 to rotate the bevel gear for driving the socket 44 to rotate the nut D on the bolt.

When it is desired to tension the bolt, the locking sleeve H is actuated upwardly by admitting fluid under pressure through inlet 29 so as to release the segments of the puller bar socket with the ridges of said segments disposed in the grooves 33 of the locking sleeve portion 25 whereupon the housing is lowered over the nut D until the base ring 41 sets on the top surface of the structure B as shown in FIG. 2 so the portions 15 of the puller bar socket segments are juxtaposed to the circumferential ribs C₂ on the bolt. Fluid pressure is then admitted through inlet 30 to actuate the locking sleeve H downwardly and thereby lock the socket segments in interlocking relation to the ribs C₂ on the bolt, with the cylindrical surfaces 32a of the sleeve portion 25 in abutting contact with the cylindrical surfaces 34a of the socket segments as shown in FIG. 2A. At the same time, the ribs 17 of the segments are firmly interlocked with the ribs 16 of the puller bar, in readiness for application of tension to the bolt.

For tensioning the bolt, hydraulic pressure is admitted to the power unit E from a suitable source under suitable valve control through the pipe coupling 6 and duct 7 so the piston 3 and puller bar are actuated upwardly and thereby exert an upward pull on the bolt. While the bolt is so held under tension the nut D is tightened against the structure A. This is done by rotating the stub shaft 49 with the handle 51 so as to cause rotation of the nut socket 44 to rotate the nut in the proper direction.

After the nut has been tightened, the hydraulic pressure is released from the piston 3 and fluid pressure is admitted through inlet 29 to actuate the locking sleeve H upwardly and thereby release the puller bar socket segments from the bolt, as shown in FIG. 2. Thereafter the housing A is lifted away from the bolt. Desirably, hoisting eyes 52 are secured to the upper end of the apparatus for connecting the tensioner to a hoisting mechanism to facilitate handling of the tensioner.

Preferably, generally known means is utilized for guiding the lower end of the puller bar and the puller bar segments into proper relation to the end of the bolt and to the ribs on the bolt, respectively. Also, there are means for measuring the extension of the bolt. Apparatus of this type is disclosed in U.S. Pat. Nos. 3,015,975 and 3,162,071. For the purpose of illustration here, there are shown a positioning tube 53 reciprocable in the puller bar and normally urged downwardly by a spring 54 with its lower end adapted to enter a recess in the end of the bolt as the housing is lowered over the bolt. Within the tube 53 is an extensometer rod 55 which projects beyond the upper end of the puller bar and has mounted thereon an extensometer or gauge 56 having an appropriate dial and pointer. The lower end of said rod contacts the end of a measuring rod 57 disposed in and contacting the bottom of a hole 58 in the bolt. Mounted on the upper end of the tube 53 is a cap 59 which actuates a contacting element 60 of the extensometer when the bolt is extended so as to indicate by the position of the pointer on the dial, the amount of extension of the bolt.

Any suitable spring means may be utilized for the return movement of the piston 3 of the power unit E, but preferably a rectangular plate 61 is set on the top of the piston and formed with a central hole 62 for the puller bar thrust nut 8 and with its corner portions extending beyond the side wall of the cylinder 2. There is a headed pin 63 screwed into each corner portion of the plate 61 and having thereon washers 64 and 65 abutting the pin head 66 and a flange 69 projecting from the power unit cylinder 2 with a compression spring 67 interposed between them so that the springs normally exert a downward force on the piston 3 tending to return the piston to its lower normal position in the cylinder 2.

We claim:

1. A bolt tensioning apparatus comprising a housing having at one end a reciprocable motor, a puller bar connected to said motor and extending into the housing for movement into upper and lower positions, the other end of said housing being adapted to be set upon a structure in coaxial loosely surrounding relation to a bolt which has a threaded nut-carrying portion and an upper portion formed for connection of the bolt to said puller bar, a puller bar socket to connect the puller bar to the bolt comprising a plurality of complemental socket segments mounted on said puller bar in encircling relation thereto and movable with the puller bar and toward and from the axis thereof, each segment including an upper mounting portion connected to the puller bar and a lower body portion having an inner surface for cooperative relation with said upper portion of the bolt to connect the puller bar to the bolt for applying tension to the bolt upon upward movement of the puller bar, a sleeve in said housing surrounding said socket segments and movable into upper and lower positions, said sleeve and said segments having coactive portions for actuating said segments into and holding them in said cooperative relation to said bolt and for actuating said segments out of said cooperative relation upon movement of said sleeve into said lower position and said upper position, respectively, and reciprocable power-operated apparatus connected to the upper end of said sleeve for actuating said sleeve into said upper and lower positions.

2. A bolt tensioning apparatus as defined in claim 1 wherein said sleeve and said socket segments have inner and outer surfaces, respectively, coactive upon movement of the sleeve into said lower position to actuate said socket segments into and hold them in said cooperative relation to said bolt.

3. A bolt tensioning apparatus as defined in claim 2 wherein the inner surface of said sleeve comprises spaced alternate circumferential ridges and grooves, said ridges having cylindrical portions and beveled sides, the outer surfaces of the socket segments having similarly shaped ridges with cylindrical surfaces and beveled sides, the beveled sides of the ridges coacting to actuate the socket segments into cooperative relation with the bolt and said cylindrical surfaces of the sleeve abutting the cylindrical surfaces of the socket segments to lock said socket segments in said cooperative relation with the bolt.

4. A bolt tensioning apparatus as defined in claim 3, wherein said sleeve and said socket segments have coactive means to actuate said socket segments out of said cooperative relation upon movement of the sleeve into its upper position.

5. A bolt tensioning apparatus as defined in claim 4 wherein said coactive means comprise blocks of said sleeve having cam surfaces coactive with cam surfaces on said socket elements.

6. A bolt tensioning apparatus as defined in claim 1 wherein the puller bar and the socket segments have outer and inner surfaces respectively, coactive to interlock said socket segments with said puller bar simultaneously with the movement of said socket segments into said cooperative relation to the bolt.

7. A bolt tensioning apparatus as defined in claim 3 wherein the puller bar and the socket segments have outer and inner surfaces respectively, coactive to interlock said socket segments with said puller car simultaneously with the movement of said socket segments into said cooperative relation to the bolt.

8. The bolt tensioning apparatus as defined in claim 1 wherein said mounting portions of the socket segments are interposed between a circumferential flange and a circumferential shoulder on said puller bar providing for movement of said segments longitudinally with the puller bar and for sliding of the segments laterally toward and from the axis of the puller bar.

9. The bolt tensioning apparatus as defined in claim 1 wherein said sleeve is reciprocably mounted coaxially on said puller bar and said power apparatus includes relatively reciprocable parts connected to said puller bar and other parts connected to said sleeve.

10. The bolt tensioning apparatus as defined in claim 1 wherein said power-operated apparatus comprises the upper portion of said sleeve providing a cylinder, there is a piston head rigidly secured on said puller bar on which said cylinder is slidable, there is a cylinder head fixed in said cylinder at each side of said piston head providing two motors to actuate said sleeve into its upper and lower positions, respectively, and with the addition of means for connecting both motors to a source of fluid under pressure.

11. The bolt tensioning apparatus as defined in claim 3, wherein said ridges on the socket segments are narrower than the ridges on said sleeve, providing for play between the beveled sides of the ridges on said segments and the beveled sides of the ridges on said sleeve.

* * * * *